UNITED STATES PATENT OFFICE.

LUDWIG BENDA, OF FRANKFORT-ON-THE-MAIN, GERMANY, ASSIGNOR TO FARB-WERKE VORM. MEISTER LUCIUS & BRÜNING, OF HÖCHST-ON-THE-MAIN, GERMANY, A CORPORATION OF GERMANY.

NITROAMINOPHENYLARSINIC ACID.

1,075,587.
No Drawing.

Specification of Letters Patent. Patented Oct. 14, 1913.
Application filed November 6, 1912. Serial No. 729,754.

*To all whom it may concern:*

Be it known that I, LUDWIG BENDA, Ph. D., chemist, a citizen of the Republic of Switzerland, residing at Frankfort-on-the-Main, Germany, have invented certain new and useful Improvements in Nitroaminophenylarsinic Acid, of which the following is a specification.

I have found that the nitroacidylaminophenylarsinic acids

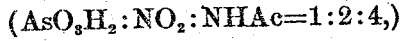

obtainable, for instance, by the action of arsenious acid upon the diazo compound of the acetyl-nitro-p-phenylenediamin

can be transformed, into the hitherto unknown nitroaminophenylarsinic acid of the constitutional formula:

by heating them with saponifying agents.

The new nitroaminophenylarsinic acid forms orange-colored needles which are very difficultly soluble in cold water or alcohol and in diluted mineral acids, but readily soluble in alkalis and sodium acetate. On heating to 240° C. it assumes a dark color and melts with decomposition at about 258° C. It is of great value as parent material for preparing arsenic compounds to be used for therapeutic purposes.

The following example illustrates my invention: 6 kilos of nitroacetylaminophenylarsinic acid are heated on the reflux apparatus for several hours with 50 liters of sulfuric acid of 10% strength. The whole mixture first turns into a solution, and after some time the nitroaminophenylarsinic acid separates in the form of brownish, long needles. When recrystallized from hot water, it forms orange-colored small needles which are scarcely soluble in cold water and which dissolve only with difficulty in diluted mineral acids and in alcohol, more readily in methyl alcohol and glacial acetic acid, very readily in alkalis and sodium acetate. When heated, the new compound assumes a dark color at 240° C., and melts at about 258° C. with decomposition.

Having now described my invention, what I claim is:

As a new product, the nitroaminophenylarsinic acid containing the atom groups $AsO_3H_2$, $NO_2$, $NH_2$ in the 1:2:4 position, crystallizing in the form of orange-colored needles, difficultly soluble in water, alcohol, diluted mineral acid, readily soluble in alkalis and sodium acetate, assuming when heated to about 240° C. a dark color and melting at a temperature of about 258° C. with decomposition.

In testimony whereof, I affix my signature in presence of two witnesses.

LUDWIG BENDA.

Witnesses:
JEAN GRUND,
CARL GRUND.